(12) United States Patent
Imai et al.

(10) Patent No.: US 6,546,659 B1
(45) Date of Patent: Apr. 15, 2003

(54) STEERING WHEEL MARK MEMBER FIXING STRUCTURE

(75) Inventors: Keisuke Imai, Aichi-ken (JP); Hiroshi Saito, Tochigi-ken (JP)

(73) Assignee: Kabushiki Kaisha Torai-Rika-Denki-Seisakusho Aichi-ken (JP)

( * ) Notice: Subject to any disclaimer, the term of this patent is extended or adjusted under 35 U.S.C. 154(b) by 116 days.

(21) Appl. No.: 09/695,417

(22) Filed: Oct. 25, 2000

(30) Foreign Application Priority Data

Nov. 8, 1999 (JP) .......................... 11-316608

(51) Int. Cl.⁷ .......................... G09F 03/08; G09F 21/04
(52) U.S. Cl. .................. 40/662; 40/593; 40/299.01; 74/558
(58) Field of Search ............... 40/593, 662, 622, 40/299.01; 280/731, 728.3; 74/558, 558.5; 24/703.5, 458

(56) References Cited

U.S. PATENT DOCUMENTS

| 1,928,211 A | * | 9/1933 | Reiter | 40/622 |
| 4,011,676 A | * | 3/1977 | Ritter | 40/622 |
| 5,775,721 A | * | 7/1998 | Grout | 280/731 X |
| 6,047,984 A | * | 4/2000 | Preisler et al. | 280/731 X |

FOREIGN PATENT DOCUMENTS

FR 813255 * 5/1937 .................. 40/622

* cited by examiner

*Primary Examiner*—Joanne Silbermann
(74) *Attorney, Agent, or Firm*—Nixon Peabody LLP; Thomas W. Cole

(57) ABSTRACT

A steering wheel mark member fixing structure which enables a mark member to be strongly fixed to a pad cover and enables a reduction in costs. At a steering wheel, in a state in which fixing legs of the mark member are inserted in fixing holes of a pad cover, the fixing legs are bent, such that distal end portions of the fixing legs are abutted against taper portions adjacent to the fixing holes. The taper portions have a triangular cross-sectional configuration. Thus, the fixing legs are bent at acute angles, and bent portions of the fixing legs abut the corner portions of the taper portions. The distal end portions of the fixing legs are caught by a strong force on the taper portions, and it is difficult for the bent state of the fixing legs to be released. The mark member can thereby be strongly fixed to the pad cover. As a result, there is no need for another member such as a pin, as there is in conventional structures. A number of parts and costs are reduced.

13 Claims, 9 Drawing Sheets

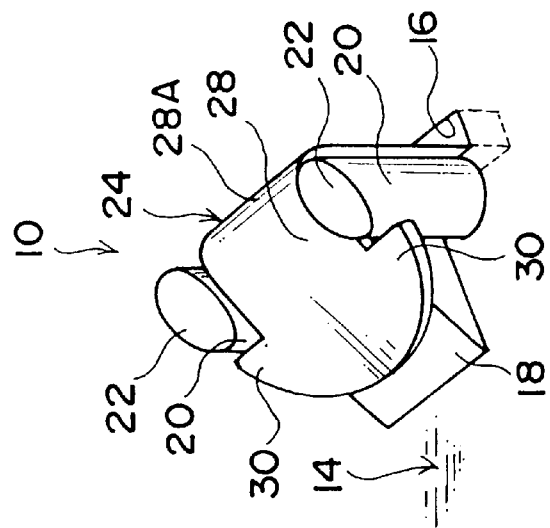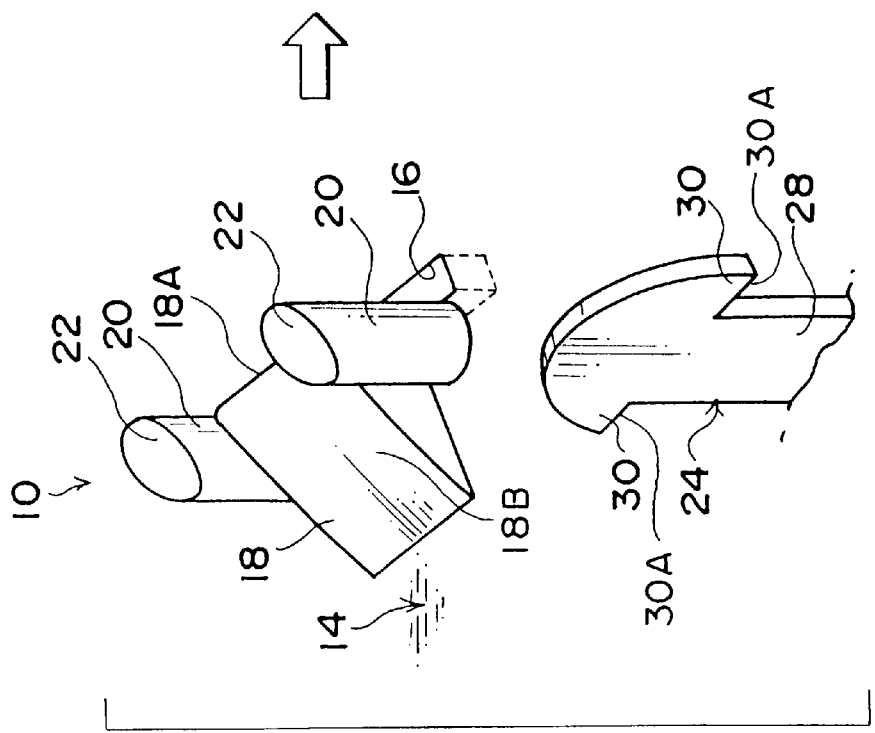

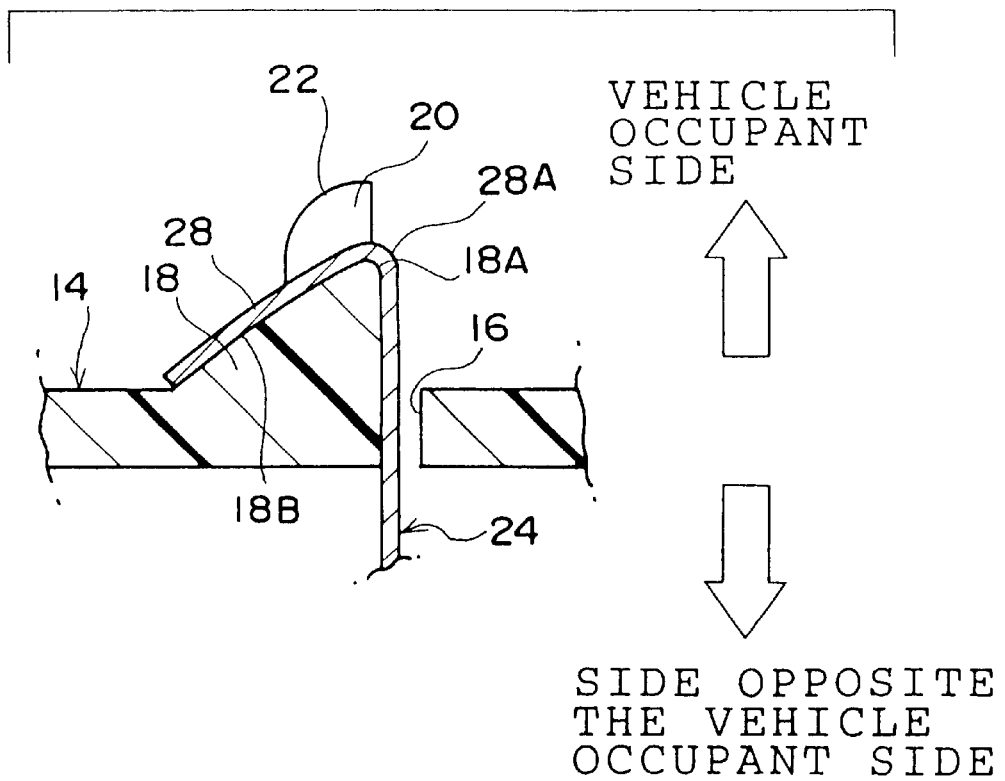

STEERING WHEEL MARK MEMBER FIXING STRUCTURE

BACKGROUND OF THE INVENTION

1. Field of the Invention

The present invention relates to a steering wheel mark member fixing structure for fixing a mark member for decoration to a pad cover provided at a steering wheel of a vehicle.

2. Description of the Related Art

A conventional steering wheel of a vehicle, e.g., a steering wheel 100 illustrated in FIG. 8, is equipped with an air bag device 102. The air bag device 102 has a bag body (not shown) for protection of a vehicle occupant (driver). The bag body is inflates and expands at the time of an emergency of the vehicle. A pad cover 104 is provided at the vehicle occupant side of the bag body. At the time of an emergency of the vehicle, the pad cover 104 can be broken by the inflating and expanding bag body. Further, a mark member 106 formed of, for example, metal or the like, is provided at the pad cover 104 for decoration.

At the steering wheel 100, four mounting holes 108 are formed in the pad cover 104. Four metal mounting legs 110 are formed at the mark member 106 in correspondence with the mounting holes 108. With the mounting legs 110 of the mark member 106 inserted in the mounting holes 108 of the pad cover 104, the distal end portions of the inserted mounting legs 110 are bent at right angles so as to abut the side of the pad cover 104 opposite the vehicle occupant side (so as to make the distal end portions of the mounting legs 110 and the inner wall surface of the pad cover 104 at the side opposite the vehicle occupant parallel). In this way, the distal end portions of the bent mounting legs 110 catch on the side of the pad cover 104 opposite the vehicle occupant, such that the mark member 106 is fixed to the pad cover 104.

However, in the steering wheel 100, the mounting legs 110 are merely bent at right angles. Thus, the force with which the distal end portions of the mounting legs 110 catch on the side of the pad cover 104 opposite the vehicle occupant is weak. As a result, when the mark member 106 is large and the mass thereof is great, it is easy for the state in which the mounting legs 110 are bent to be released, i.e., it is easy for the mark member 106 to come off from the pad cover 104. In order to prevent this, the mark member 106 is fixed to the pad cover 104 by a process such as crimping by another member such as a pin or the like. There is therefore the need to improve the power of the fixing of the mark member 106 to the pad cover 104. To this end, other members such as pins or the like are needed, and the problem arises that the number of parts increases and the cost increases.

SUMMARY OF THE INVENTION

In view of the aforementioned, an object of the present invention is to provide a steering wheel mark member fixing structure which can strongly fix a mark member to a pad cover and which is lower cost.

A first aspect of the present invention is a steering wheel mark member fixing structure which fixes a mark member on a pad cover provided at a steering wheel, comprising: fixing holes passing through the pad cover; projecting portions provided at a surface of the pad cover at a side opposite a vehicle occupant side, the projecting portions being adjacent to the fixing holes and projecting substantially toward the side opposite the vehicle occupant side; and fixing legs provided at the mark member and projecting toward the pad cover and adapted to be inserted into the fixing holes, wherein the mark member is fixed to the pad cover by inserting the fixing legs in the fixing holes and bending the fixing legs such that the fixing legs cover the projecting portions.

A second aspect of the present invention according to the first aspect is a steering wheel mark member fixing structure further comprising: catching projections which are provided at at least one of: (i) the projecting portions; and (ii) portions adjacent to the projecting portions on the surface of the pad cover at the side opposite the vehicle occupant side, and which project substantially toward the side opposite the vehicle occupant side; and catching portions provided at the fixing legs in correspondence with the catching projections, the catching portions being caught on the catching projections.

A third aspect of the present invention according to the second aspect is a steering wheel mark member fixing structure wherein the catching projections have guiding inclined portions which prevent the catching portions from interfering (colliding) with distal ends of the catching projections when the fixing legs are being bent.

A fourth aspect of the present invention according to the third aspect is a steering wheel mark member fixing structure wherein the guiding inclined portions are configurations which substantially correspond to tracks (loci) of movement of the fixing legs when the fixing legs are being bent.

A fifth aspect of the present invention is a steering wheel mark member fixing structure which fixes a mark member on a pad cover provided at a steering wheel, comprising: fixing holes passing through the pad cover; taper portions having substantially triangular cross-sectional configurations, and provided at a surface of a pad cover at a side opposite a vehicle occupant side, and being adjacent to the fixing holes, and projecting substantially toward the side opposite the vehicle occupant side; and plastically deformable fixing legs provided at the mark member, projecting toward the pad cover and adapted to be inserted into the fixing holes, wherein the mark member is fixed to the pad cover by inserting the fixing legs in the fixing holes and bending the fixing legs such that distal end portions of the fixing legs abut the taper portions.

In the steering wheel mark member fixing structure of the fifth aspect, in a state in which the plastically deforming fixing legs of the mark member are inserted in the fixing holes which pass through the pad cover provided at the steering wheel, the fixing legs are bent. The distal end portions of the fixing legs are thereby made to abut the taper portions provided adjacent to the fixing holes. In this way, the distal end portions of the fixing legs catch on the taper portions, and the mark member is fixed to the pad cover.

Here, because the taper portion has a substantially triangular columnar configuration (the cross-section thereof is substantially triangular), by making the distal end portions of the fixing legs tightly contact (abut) the taper portions, the fixing legs are bent in substantial V-shapes (at acute angles), namely, the distal end portions of the fixing legs are inclined at predetermined angle (toward the vehicle driver side) with respect to the inner wall surface of the pad cover, and the portion of the fixing legs which are bent (bent portion) abuts the corner portion of the taper portions, or are being near to the corner portions of the taper portions. In this way, the distal end portions of the fixing legs are caught on the taper portions with a strong force, and it is difficult for the bent state of the fixing legs to be cancelled, thereby the mark member can be strongly fixed to the pad cover.

Further, because the mark member can be strongly fixed to the pad cover, even if the mark member is large and heavy, it does not come off from the pad cover. Accordingly, there is no need to provide other parts such as pins or the like as in the conventional art, and the number of parts can be reduced, resulting in a reduction in costs.

A sixth aspect of the present invention according to the fifth aspect is a steering wheel mark member fixing structure further comprising: catching projections which are provided at at least one of: (i) the taper portions; and (ii) portions adjacent to the taper portions on the surface of the pad cover at the side opposite the vehicle occupant side, and which project substantially toward the side opposite the vehicle occupant side; and catching portions provided at the fixing legs in correspondence with the catching projections, the catching portions being caught on the catching projections.

In the steering wheel mark member fixing structure of the sixth aspect, the catching portions which are provided at the fixing legs catch on the catching projections provided at the taper portions or adjacent the taper portions. Thus, it is even more difficult to cancel the state in which the fixing legs are bent. In this way, the mark member can be fixed even more strongly to the pad cover.

A seventh aspect of the present invention according to the sixth aspect is a steering wheel mark member fixing structure wherein guiding inclined portions are formed at distal ends of the catching projections, and at a time of bending the fixing legs, the guiding inclined portions prevent the catching portions from interfering (colliding) with the distal ends of the catching projections, and guide bending of the fixing legs.

In the steering wheel mark member fixing structure of the seventh aspect, the guiding inclined portions are formed at the distal ends of the catching projections. Due to the guiding inclined portions guiding the bending of the fixed legs of the mark member, the catching portions can be prevented from colliding with the distal ends of the catching projections. As a result, the work for bending the fixing legs can be facilitated.

Further, because the bending of the fixing legs is guided by the guiding inclined portions, the catching portions contact the catching projections when the distal end portions of the fixing legs abut the taper portions (i.e., when the mark member is fixed to the pad cover). In this way, no play arises between the catching portions and the catching projections, and joggling of the mark member with respect to the pad cover can be prevented.

A eighth aspect of the present invention according to the fifth aspect is a steering wheel mark member fixing structure wherein a flange portion which projects toward the pad cover is formed at a peripheral edge of the mark member.

In the steering wheel mark member fixing structure of the eighth aspect, the flange portion which projects toward the pad cover is formed at the periphery of the mark member. Thus, the mark member is reinforced by the flange portion, and accordingly, the strength of the mark member can be improved.

BRIEF DESCRIPTION OF THE DRAWINGS

FIG. 1A is an exploded perspective view illustrating main portions of a steering wheel to which is applied the steering wheel mark member fixing structure relating to a first embodiment of the present invention.

FIG. 1B is a perspective view illustrating main portions of the steering wheel.

FIG. 2 is a cross-sectional view illustrating main portions of the steering wheel to which is applied to the steering wheel mark member fixing structure relating to the first embodiment of the present invention.

DESCRIPTION OF THE PREFERRED EMBODIMENTS

First Embodiment

Figure 3:
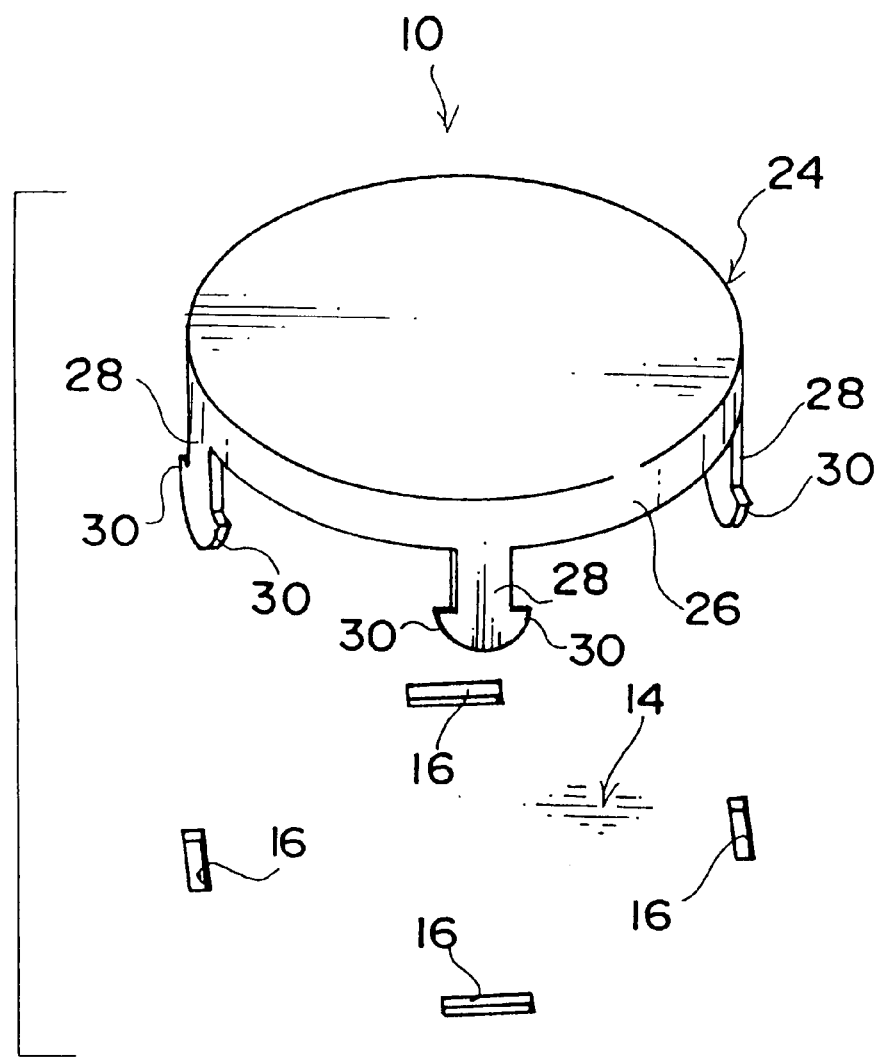
FIG. 3 is an exploded perspective view illustrating main portions of the steering wheel to which is applied the steering wheel mark member fixing structure relating to the first embodiment of the present invention.
Figure 4:
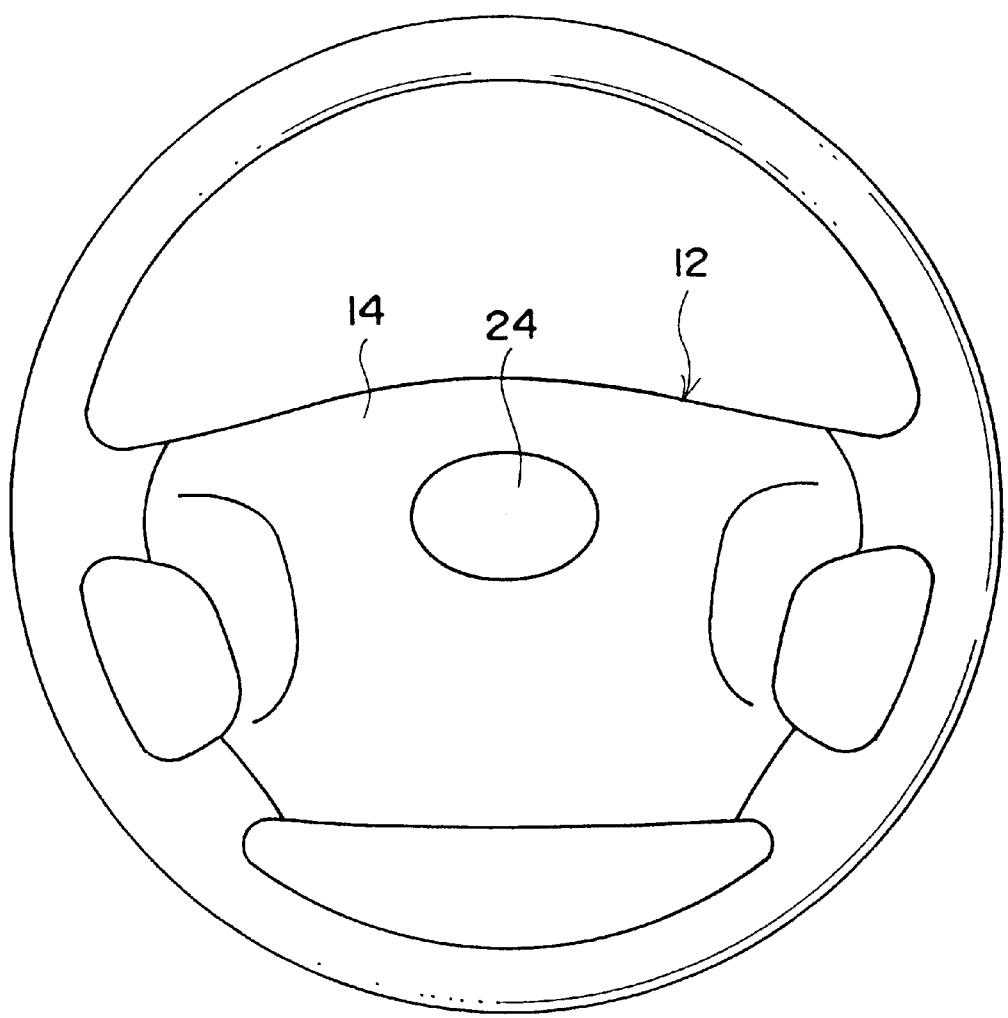
FIG. 4 is a front view illustrating the overall structure of the steering wheel to which is applied the steering wheel mark member fixing structure relating to the first embodiment of the present invention.

FIG. 1A is an exploded perspective view of main portions of a steering wheel 10 to which is applied a steering wheel mark member fixing structure relating to a first embodiment of the present invention. FIG. 1B is a perspective view of main portions of the steering wheel 10. FIG. 2 is a cross-sectional view of main portions of the steering wheel 10. FIG. 3 is an exploded perspective view of main portions of the steering wheel 10. FIG. 4 is a front view of the overall structure of the steering wheel 10.

The steering wheel 10 is provided with an air bag device 12 at the central portion thereof. The air bag device 12 is provided with a bag body (not shown) for protection of a vehicle occupant. The bag body expands and unfolds at the time of an emergency of the vehicle (for example, when the vehicle rapidly decelerates).

A pad cover 14 is provided at the vehicle occupant side of the bag body. The pad cover 14 opposes the vehicle occupant and can be broken by the bag body which expands and unfolds at the time of an emergency of the vehicle. A plurality of fixing holes 16 are formed at the substantially central portion of the pad cover 14. (Four fixing holes 16 are formed in the present embodiment.) The fixing holes 16 pass through the pad cover 14.

At the surface of the pad cover 14 opposite the vehicle occupant (i.e., at the inner wall surface of the pad cover 14), taper portions 18 are formed next to the openings of the fixing holes 16 at the steering wheel 10 central side of the openings of the fixing holes 16. The taper portions 18 are substantially shaped as triangular columns (have a substantially triangular cross-section). It is preferable that the taper portions 18 are formed integrally with the pad cover 14. The surface of the pad cover 14 opposite the vehicle occupant is continuous with taper surfaces 18B of the taper portions. The taper surfaces 18B are inclined upwardly from the side thereof nearer to the center of the steering wheel 10 toward the side thereof nearer to the periphery of the steering wheel 10.

Substantially cylindrical catching projections 20 are formed in pairs adjacent to the taper portions 18 at the both sides of the taper portions 18. (Two catching projections 20 are formed in pair adjacent to each taper portion 18 at the both sides of the taper portion 18.) The catching projections 20 project toward the side opposite the vehicle occupant from the surface of the pad cover 14 at the side opposite the vehicle occupant, and correspond to catching portions 30 which will be described later. Guiding inclined portions 22 are formed at the distal ends of the catching projections 20. (Guiding inclined portion 22 is formed at each distal end of the catching projection 20.) The guiding inclined portions 22 are inclined downward from the side thereof nearer to the periphery of the steering wheel 10 toward the side thereof nearer to the center of the steering wheel 10, and have a substantially circular-arc-shaped configuration when viewed from the side (see FIG. 2).

A mark member 24, which is made of metal and is substantially disc-shaped, is provided at the pad cover 14 for decoration thereof. A flange portion 26 is formed at the peripheral portion of the mark member 24. The flange portion 26 projects toward the pad cover 14 side. In this way, the flange portion 26 reinforces the mark member 24.

A plurality (four in the present embodiment) of fixing legs 28 are formed continuously with the flange portion 26 at the peripheral portion of the mark member 24. (It is preferable that the fixing legs 28 are formed integrally with the flange portion 26.) In the same way as the mark member 24, the fixing legs 28 are formed of metal, and therefore, are plastically deformable. The fixing legs 28 project toward the pad cover 14 so as to correspond to the fixing holes 16 of the pad cover 14. By bending the fixing legs 28 toward the taper portions 18 in a state in which the fixing legs 28 are inserted into the fixing holes 16, the distal end portions of the fixing legs 28 are made to fit tightly to (abut) the taper surfaces 18B of the taper portions 18. In this way, the mark member 24 is fixed to the pad cover 14. Namely, because the taper portions 18 have substantially triangular columnar configuration (the cross-section thereof is substantially triangular), by making the distal end portions of the fixing legs 28 tightly contact (abut) the taper surfaces 18B of the taper portions 18, the fixing legs 28 are bent in substantial V-shapes (at acute angles), namely, the distal end portions of the fixing legs 28 are inclined at predetermined angle (toward the vehicle driver side) with respect to the inner wall surface of the pad cover 14, and each portion of the fixing leg 28 which is bent (bent portion 28A) abuts a corner portion 18A of the taper portion 18. In this way, the distal end portions of the fixing legs 28 are caught on the taper portions 18 with a strong force, and it is difficult for the bent state of the fixing legs 28 to be cancelled.

Pairs of catching portions 30 are formed on the distal ends of the fixing legs 28 in correspondence with the catching projections 20. (Two catching portions 30 are formed on distal end of each fixing leg 28 in correspondence with the catching projections 20.) The catching portions 30 are formed by making distal ends of the fixing legs 28 project out toward the both transverse direction sides of the fixing legs 28, and the catching portions 30 catch on the catching projections 20. In this way, it is even more difficult to cancel the bent state of the fixing legs 28. Further, the guiding inclined portions 22 are formed at the distal ends of the catching projections 20. Thus, when the bending of the fixing legs 28 is guided and the fixing legs 28 are bent, the catching portions 30 are prevented from colliding with the distal ends of the catching projections 20. Further, because the bending of the fixing legs 28 is guided by the guiding inclined portions 22, when the fixing legs 28 are bent at the corner portions 18A such that the distal end portions abut the taper surfaces 18B of the taper portions 18, the catching portions 30 contact the catching projections 20. As a result, play can be prevented from arising between the catching portions 30 and the catching projections 20, and the mark member 24 is reliably fixed to the pad cover 14.

Next, operation of the present embodiment will be described.

In the steering wheel 10 having the above-described structure, the plastically deforming fixing legs 28 of the mark member 24 are bent in a state in which they are inserted in the fixing holes 16 which pass through the pad cover 14 provided at the steering wheel 10. Thus, the distal end portions of the fixing legs 28 are made to fit tightly to (abut) the taper portions 18 provided adjacent to the fixing holes 16. In this way, the distal end portions of the fixing legs 28 catch on the taper portions 18, and the mark member 24 is fixed to the pad cover 14.

Here, because the taper portion 18 has a substantially triangular columnar configuration (the cross-section thereof is substantially triangular), by making the distal end portions of the fixing legs 28 tightly contact (abut) the taper surfaces 18B of the taper portions 18, the fixing legs 28 are bent in substantial V-shapes (at acute angles), namely, the distal end portions of the fixing legs 28 are inclined at predetermined angle (toward the vehicle driver side) with respect to the inner wall surface of the pad cover 14, and the portion of the fixing leg 28 which is bent (bent portion 28A) abuts the corner portion 18A of the taper portion 18. Thus, the distal end portions of the fixing legs 28 are caught on the taper portions 18 with a strong force, and it is difficult for the bent state of the fixing legs 28 to be cancelled. In this way, the mark member 24 can be fixed strongly to the pad cover 14.

Further, because the mark member 24 can be strongly fixed to the pad cover 14, even if the mark member 24 is large and heavy, it does not come off from the pad cover 14. Accordingly, there is no need to provide other parts such as pins or the like as in the conventional art, and the number of parts can be reduced, resulting in a reduction in costs.

Further, the catching portions 30 provided at the fixing legs 28 are caught on the catching projections 20 provided adjacent to the taper portions 18. Thus, it is even more difficult to cancel the bent state of the fixing legs 28, and the mark member 24 can be fixed even more strongly to the pad cover 14.

Further, the guiding inclined portions 22, which are circular-arc-shaped in side view, are formed at the distal ends of the catching projections 20. The guiding inclined portions 22 guide the bending of the fixing legs 28 of the mark member 24. (The aforementioned substantially circular-arc shape of each guiding inclined portion 22 is formed on the basis of the locus of movement of a region 30A of the catching portion 30 at the time the fixing leg 28 is bent. Thus, when the fixing leg 28 is bent, the region 30A of the catching portion 30 moves so as to be guided by the guiding inclined portion 22.) Thus, the catching portions 30 of the fixing legs 28 are prevented from colliding with the distal ends of the catching projections 20. As a result, the work of bending the fixing legs 28 is easy.

Because the bending of the fixing legs 28 is guided by the guiding inclined portions 22, when the fixing legs 28 are bent at the corner portions 18A such that the distal end portions abut the taper surfaces 18B of the taper portions 18, the catching portions 30 contact the catching projections 20. As a result, play can be prevented from arising between the catching portions 30 and the catching projections 20, and the mark member 24 is reliably fixed to the pad cover 14.

In a case in which the guiding inclined portions 22 are not formed at the distal ends of the catching projections 20, when the fixing legs 28 are bent, in order for the region 30A of the catching portion 30 to not collide with the distal end of the catching projection 20 (the distal end of the catching projection 20 nearer to the steering wheel 10 central side), the length of the fixing leg 28 from the bent portion 28A to the region 30A of the catching portion 30 must be made longer than a case in which the guiding inclined portion 22 is formed at the distal end of the catching projection 20.

As a result, when each fixing leg 28 is bent at the corner portion 18A and the distal end portion abuts the taper surface 18B of the taper portion 18, the region 30A of the catching portion 30 does not contact the catching projection 20 (there is a gap between the region 30A and the catching projection 20). Thus, there is play between the region 30A of the catching portion 30 and the catching projection 20.

The flange portion 26, which projects toward the pad cover 14, is formed at the periphery of the mark member 24. Thus, the mark member 24 is reinforced by the flange portion 26. Accordingly, the strength of the mark member 24 can be improved.

In the present first embodiment, the guiding inclined portions 22 are formed in circular-arc shapes as seen in side view. However, it suffices for the guiding inclined portions 22 to guide the bending of the fixing legs 28 of the mark member 24 and to prevent the catching portions 30 from colliding with the distal ends of the catching projections 20. For example, the guiding inclined portions may be inclining planar, i.e., linear when viewed from the side.

Figure 9:
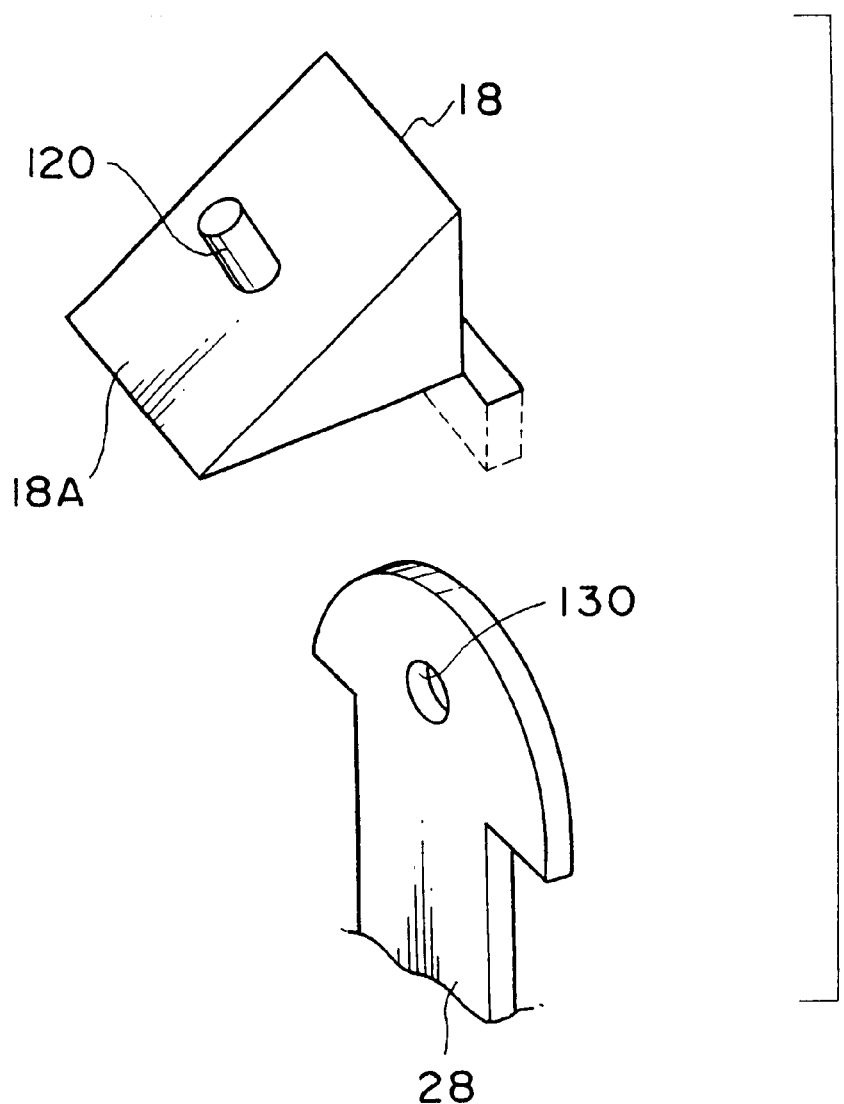
FIG. 9 is an exploded perspective view illustrating main portions of a steering wheel to which is applied a steering wheel mark member fixing structure relating to a modified example of the first embodiment of the present invention.

In the present first embodiment, the structure in which the catching portions 30 catch on the catching projections 20 is achieved by providing the catching projections 20 adjacent to the taper portions 18 and by forming the catching portions 30 by projecting the distal ends of the fixing legs 28 in the transverse direction of the fixing legs 28. However, it is also possible to provide a structure in which a catching projection 120 is formed at each taper surface 18B of the taper portion 18 and a catching hole 130 (serving as a catching portion) is formed in each fixing leg 28, and the catching projection 120 is inserted in the catching hole 130 such that the catching hole 130 (catching portion) is caught on the catching projection 120 (see FIG. 9).

In the present first embodiment, the distal end portions of the fixing legs 28 are made to tight contact (abut) the taper surfaces 18B of the taper portions 18, and the bent regions (bent portions 28A) of the fixing legs 28 abut the corner portions 18A of the taper portions 18. However, when the distal end portions of the fixing legs are made to tightly contact (abut) the taper portions, there may be a slight gap between the bent region (bent portion 28A) of the fixing leg and the corner portion 18A of the taper portion (see FIG. 10).

Second Embodiment

Figure 5:
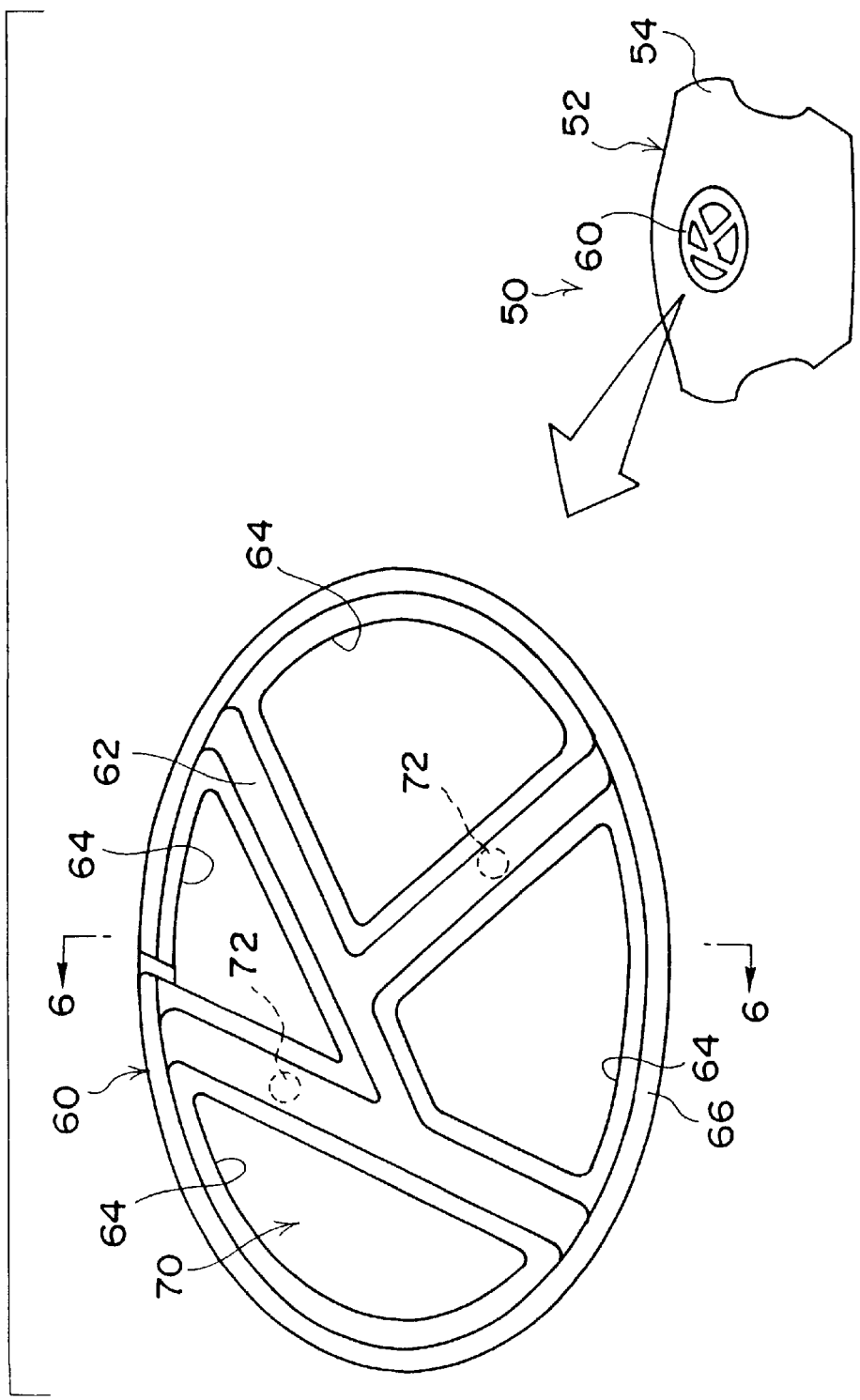
FIG. 5 is a perspective view illustrating main portions of a steering wheel to which is applied the steering wheel mark member fixing structure relating to the second embodiment of the present invention.
Figure 6:
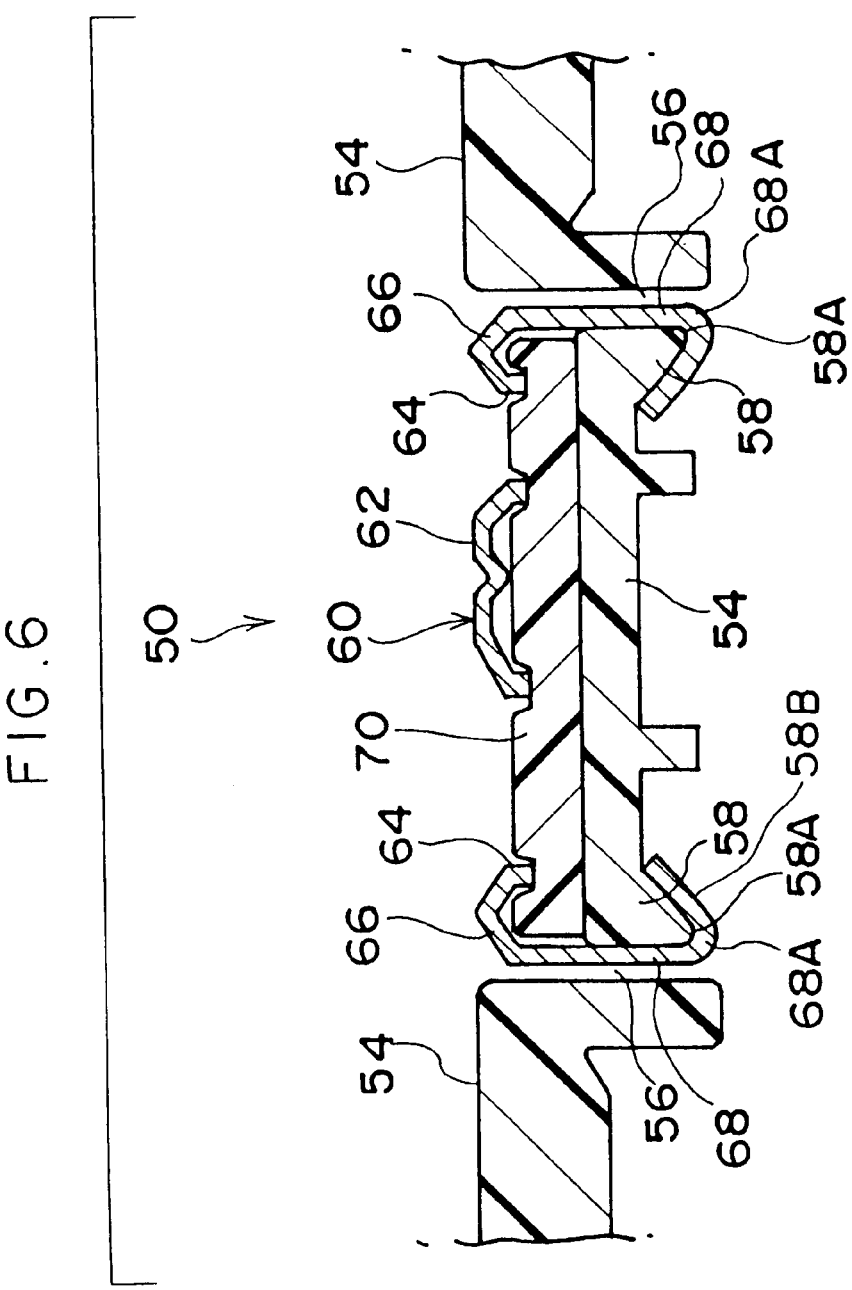
FIG. 6 is a cross-sectional view (taken along line 6—6 of FIG. 5) illustrating main portions of the steering wheel to which is applied the steering wheel mark member fixing structure relating to the second embodiment of the present invention.

In FIG. 5, main portions of a steering wheel 50, to which a steering wheel mark member fixing structure relating to a second embodiment of the present invention is applied, are illustrated in perspective view. In FIG. 6, main portions of the steering wheel 50 are shown in cross-sectional view (a cross-sectional view taken along line 6—6 of FIG. 5).

The steering wheel 50 is provided with an air bag device 52 at the central portion thereof. The air bag device 52 is provided with a bag body (not shown) for protection of a vehicle occupant. The bag body expands and unfolds at the time of an emergency of the vehicle (i.e., when the vehicle rapidly decelerates).

A pad cover 54 is provided at the vehicle occupant side of the bag body. The pad cover 54 opposes the vehicle occupant and can be broken by the bag body which expands and unfolds at the time of an emergency of the vehicle. A plurality of fixing holes 56 are formed at the substantially central portion of the pad cover 54. The fixing holes 56 pass through the pad cover 54.

At the surface of the pad cover 54 opposite the vehicle occupant (i.e., at the inner wall surface of the pad cover 54), taper portions 58 are formed next to the openings of the fixing holes 56 at the steering wheel 50 central side of the openings of the fixing holes 56. The taper portions 58 are substantially shaped as triangular columns (have a substantially triangular cross-section). It is preferable that the taper portions 58 are formed integrally with the pad cover 54.

A substantially disc-shaped mark member 60 is provided at the pad cover 54 for decoration thereof. A decorative portion 62 made of metal is formed at the front surface of the mark member 60 (the surface of the mark member 60 facing the vehicle occupant). A letter (the letter "K" in the present second embodiment) is formed at the front surface of the mark member 60 by the decorative portion 62. Further, the regions of the front surface of the mark member 60, other than the peripheral portion and the decorative portion 62, are hollowed out such that hollow portions 64 are formed. A flange portion 66 is formed at the peripheral portion of the front surface of the mark member 60. The flange portion 66 projects toward the pad cover 54. The flange portion 66 thereby reinforces the mark member 60.

A plurality of fixing legs 68 are formed continuously with the flange portion 66 at the peripheral portion of the mark member 60. the fixing legs 68 are made of metal and thus deform plastically. The fixing legs 68 project toward the pad cover 54 in correspondence with the fixing holes 56. By bending the fixing legs 68 toward the taper portions 58 in a state in which the fixing legs 68 are inserted in the fixing holes 56, the distal end portions of the fixing legs 68 are set in close contact with (abut) the taper surfaces 58B of the taper portions 58. In this way, the mark member 60 is fixed to the pad cover 54. Namely, because the taper portion 58 has a substantially triangular columnar configuration (the cross-section thereof is substantially triangular), by making the distal end portions of the fixing legs 68 tightly contact (abut) the taper surfaces 58B of the taper portions 58, the fixing legs 68 are bent in substantial V-shapes (at acute angles), and the portion of the fixing leg 68 which is bent (bent portion 68A) abuts a corner portion 58A of the taper portion 58. In this way, the distal end portions of the fixing legs 68 are caught on the taper portions 58 with a strong force, and it is difficult for the bent state of the fixing legs 68 to be cancelled.

A plate member 70 is nipped between the pad cover 54 and the front surface of the mark member 60. Portions of the plate member 70 are exposed from the hollow portions 64 of the mark member 60. In this way, the plate member 70 serves as a background for the front surface of the mark member 60. Projections 72 are formed on the vehicle occupant side surface of the plate member 70 at portions which are hidden by the decorative portion 62 of the mark member 60. Due to the projections 72 abutting the decorative portion 62, deformation and breakage of the decorative portion 62 is prevented.

Next, operation of the present second embodiment will be described.

In the steering wheel 50 having the above-described structure, the plastically deforming fixing legs 68 of the mark member 60 are bent in a state in which they are inserted in the fixing holes 56 which pass through the pad cover 54 provided at the steering wheel 50. Thus, the distal end portions of the fixing legs 68 are made to fit tightly to (abut) the taper portions 58 provided adjacent to the fixing holes 56. In this way, the distal end portions of the fixing legs 68 catch on the taper portions 58, and the mark member 60 is fixed to the pad cover 54.

Namely, because the taper portion 58 has a substantially triangular columnar configuration (the cross-section thereof is substantially triangular), by making the distal end portions of the fixing legs 68 tightly contact (abut) the taper surfaces 58B of the taper portions 58, the fixing legs 68 are bent in substantial V-shapes (at acute angles), and the portion of the fixing leg 68 which is bent (bent portion 68A) abuts the corner portion 58A of the taper portion 58. In this way, the distal end portions of the fixing legs 68 are caught on the taper portions 58 with a strong force, and it is difficult for the bent state of the fixing legs 68 to be cancelled, thereby the mark member 60 can be fixed to the pad cover 54 strongly.

Further, because the mark member 60 can be strongly fixed to the pad cover 54, even if the mark member 60 is large and heavy, it does not come off from the pad cover 54. Accordingly, there is no need to provide separate parts such as pins or the like as in the conventional art, and the number of parts can be reduced, resulting in a reduction in costs.

The flange portion 66, which projects toward the pad cover 54, is formed at the periphery of the mark member 60. Thus, the mark member 60 is reinforced by the flange portion 66. Accordingly, the strength of the mark member 60 can be improved.

Moreover, the projections 72 formed at the surface of the plate member 70 abut the decorative portion 62 of the mark member 60. In this way, deformation and breakage of the decorative portion 62 can be prevented.

The plate member 70 is nipped between the pad cover 54 and the front surface of the mark member 60. Portions of the plate member 70 are exposed from the hollow portions 64 of the mark member 60. In this way, the plate member 70 serves as a background for the front surface of the mark member 60.

If, unlike the present second embodiment, the plate member 70 is not provided, and the regions of the front surface of the mark member other than the peripheral portion and the decorative portion are not hollowed out such that the background portion is formed at the regions of the front surface of the mark member other than the peripheral portion and the decorative portion, and this background portion serves as a background for the front surface of the mark member, when the color, impression, pattern or the like of the background of the front surface of the mark member is to be changed, the background portion may be painted (printed) for example. However, with painting (printing), problems arise in that there are cases in which the impression of the background portion does not match the desired impression, and the cost of painting (printing) is high.

In contrast, in the present second embodiment, the plate member 70 is provided separately from the mark member 60. In order to change the color, impression, pattern or the like of the background of the front surface of the mark member 60, it suffices to replace the plate member 70 with a desired plate member 70. As a result, there is no need to paint (print) the background of the front surface of the mark member 60. The impression of the background can be made to match the desired impression, and costs involved in changing the background can be reduced.

If, unlike the present second embodiment, the plate member 70 is not provided and the surface of the pad cover is exposed from the hollow portions of the mark member such that portions of the surface of the pad cover serve as background of the front surface of the mark member, in order to satisfactorily change the color, impression, pattern or the like of the background of the display surface of the mark member (without painting (printing) the portions of the pad cover corresponding to the background of the front surface of the mark member), the entire pad cover, which is a large product, must be replaced. Accordingly, it is difficult to satisfactorily change the color, impression, pattern or the like of the background of the front surface of the mark member. Further, with such a structure, when the configuration of the portions of the pad cover corresponding to the background of the front surface of the mark member must be changed due to changes in the configuration of the decorative portion of the mark member, the die (mold) for the entire pad cover which is a large product must be changed. Accordingly, it is difficult to change the configuration of the background of the front surface of the mark member.

In contrast, in the present second embodiment, the plate member 70 is provided separately form the pad cover 54. In order to satisfactorily change the color, impression, pattern and the like of the background of the front surface of the mark member 60, it suffices to replace only the plate member 70 which is a small product. Accordingly, various variations on the color, impression, pattern or the like of the background of the front surface of the mark member 60 can easily be handled. Further, when the configuration of the decorative portion 62 of the mark member 60 is to be changed and thus the configuration of the background of the front surface of the mark member 60 must be changed as well, it suffices to change the die (mold) for the plate member 70 which is a small product. Accordingly, various variations on the configuration of the background (the decorative portion 62 of the mark member 60) of the front surface of the mark member 60 can be easily handled.

In the present second embodiment as well, in the same way as in the first embodiment, the structure for catching the catching portions on the catching projections may be such that the catching projections are provided on the taper surfaces of the taper portions or a pair of catching projections are provided adjacent to the taper portions, and the catching portions (catching holes) are provided at the fixing legs.

In the present second embodiment, the distal end portions of the fixing legs 68 are made to tightly contact (abut) the taper surfaces 58B of the taper portions 58, and the bent regions (bent portions 68A) of the fixing legs 68 abut the corner portions 58A of the taper portions 58. However, when the distal end portions of the fixing legs are made to tightly contact (abut) the taper portions, there may be a slight gap between the bent region (bent portion 68A) of the fixing leg and the corner portion 58A of the taper portion.

Figure 7:
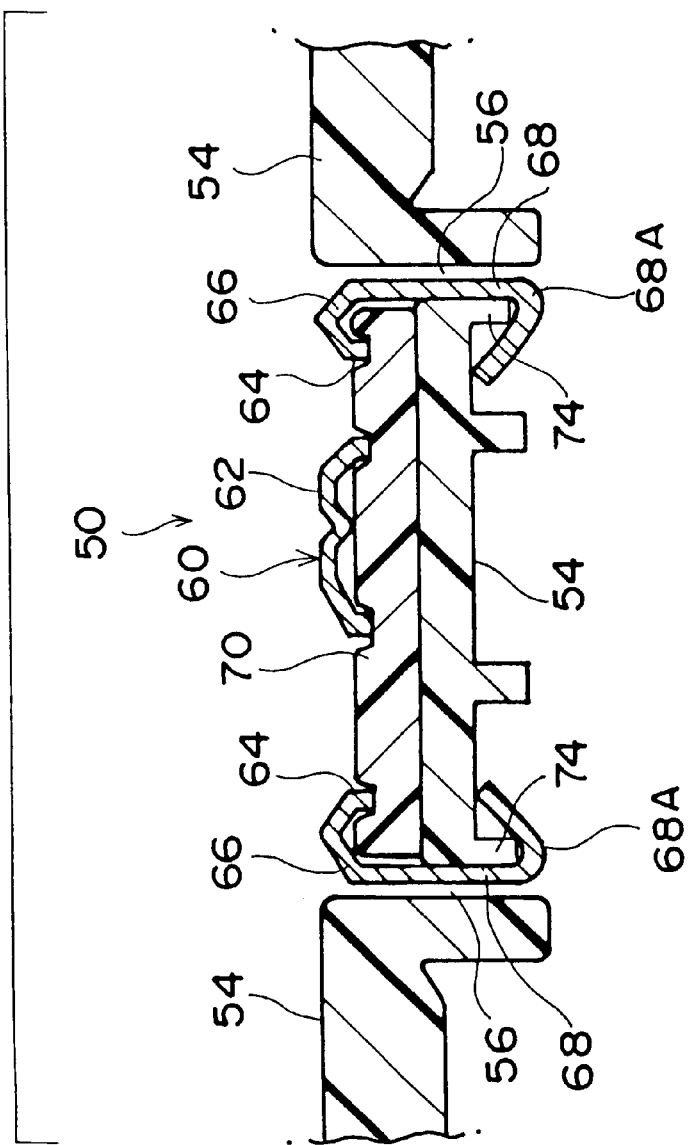
FIG. 7 is a cross-sectional view illustrating main portions of a steering wheel to which is applied a steering wheel mark member fixing structure relating to a modified example of the second embodiment of the present invention.
Figure 8A:
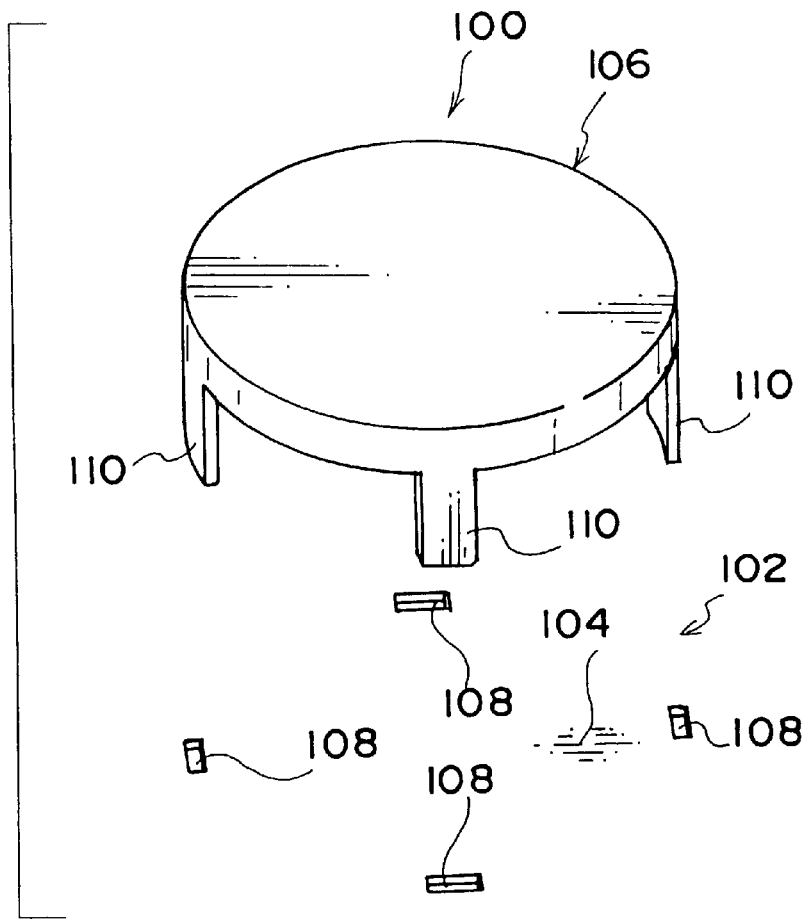
FIG. 8A is an exploded perspective view illustrating main portions of a conventional steering wheel.
Figure 8B:
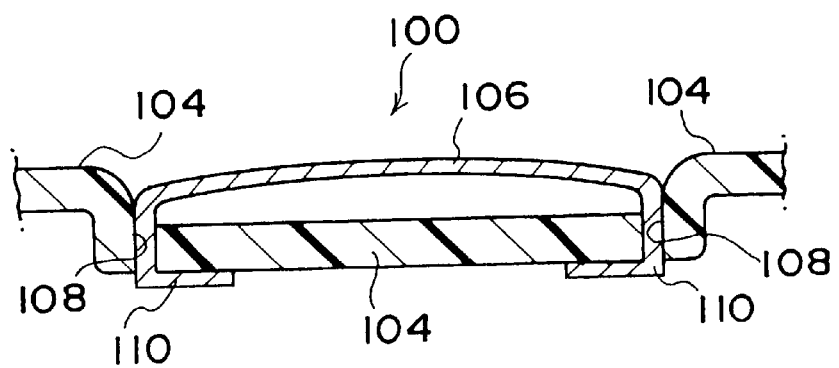
FIG. 8B is a cross-sectional view illustrating main portions of the steering wheel of FIG. 8A.

Moreover, in the present second embodiment, the taper portions 58, which are formed in substantially triangular column shapes (have substantially triangular cross-sections), are provided adjacent to the fixing holes 56. However, as illustrated in FIG. 7, instead of the taper portions 58, projecting portions 74, which are formed in thin, substantially parallelepiped shapes (having substantially rectangular cross-sections) may be provided adjacent to the fixing holes 56. In this case, by bending the fixing legs 68 of the mark member 60 such that each fixing legs 68 cover the protruding portions 74, the fixing legs 68 are bent in a substantial V-shape (at an acute angle), and the bent regions of the fixing legs 68 (the bent portions 68A) are extremely close to the distal end of the projecting portions 74. Thus, the distal end portions of the fixing legs 68 are caught by a strong force by the protruding portions 74, and it is difficult for the bent state of the fixing leg 68 to be released. In this way, the mark member 60 can be strongly fixed to the steering wheel 50. Also, it is possible that the fixing legs 68 are bent in other shape.

In the present second embodiment, a letter is formed at the front surface of the mark member 60 by the decorative portion 62. However, a pattern other than a letter may be formed at the front surface of the mark member by the decorative portion.

Further, in the above description the decorative portion 62 of the mark member 60 is formed from metal, but the decorative portion of the mark member may be formed of any material. Further, the surface of the decorative portion may be metallic-tone, wood-grained, or the like.

What is claimed is:

1. A steering wheel mark member fixing structure which fixes a mark member on a pad cover provided at a steering wheel, comprising:

fixing holes passing through the pad cover;

projecting portions provided at a surface of the pad cover at a side opposite a vehicle occupant side, the projecting portions being adjacent to the fixing holes and projecting substantially toward the side opposite the vehicle occupant side; and fixing legs provided at the mark member and projecting toward the pad cover and adapted to be inserted into the fixing holes, wherein the mark member is fixed to the pad cover by inserting the fixing legs in the fixing holes and bending the fixing legs such that the fixing legs cover the projecting portions.

2. A steering wheel mark member fixing structure according to claim 1, further comprising:

catching projections which are provided at at least one of:
   (i) the projecting portions; and
   (ii) portions adjacent to the projecting portions on the surface of the pad cover at the side opposite the vehicle occupant side, and which project substantially toward the side opposite the vehicle occupant side; and catching portions provided at the fixing legs in correspondence with the catching projections, the catching portions being caught on the catching projections.

3. A steering wheel mark member fixing structure according to claim 2, wherein the catching projections have guiding inclined portions which prevent the catching portions from interfering with distal ends of-the catching projections when the fixing legs are being bent.

4. A steering wheel mark member fixing structure according to claim 3, wherein the guiding inclined portions are configurations which substantially correspond to tracks of movement of the fixing legs when the fixing legs are being bent.

5. A steering wheel mark member fixing structure which fixes a mark member on a pad cover provided at a steering wheel, comprising:

fixing holes passing through the pad cover;

taper portions having substantially triangular cross-sectional configurations, each of which is provided at a surface of a pad cover at a side opposite a vehicle occupant side, and being adjacent to the fixing holes, and having a distal end projecting substantially toward the side opposite the vehicle occupant side; and plastically deformable fixing legs provided at the mark member, projecting toward the pad cover and adapted to be inserted into the fixing holes, wherein the mark member is fixed to the pad cover by inserting the fixing legs in the fixing holes and bending the fixing legs such that distal end portions of the fixing legs are bent over the distal ends of the taper portions at an angle exceeding 90°.

6. A steering wheel mark member fixing structure according to claim 5, further comprising:

catching projections which are provided at at least one of:
   (i) the taper portions; and
   (ii) portions adjacent to the taper portions on the surface of the pad cover at the side opposite the vehicle occupant side, and which project substantially toward the side opposite the vehicle occupant side; and catching portions provided at the fixing legs in correspondence with the catching projections, the catching portions being caught on the catching projections.

7. A steering wheel mark member fixing structure according to claim 6, wherein guiding inclined portions are formed at distal ends of the catching projections, and at a time of bending the fixing legs, the guiding inclined portions prevent the catching portions from interfering with the distal ends of the catching projections, and guide bending of the fixing legs.

8. A steering wheel mark member fixing structure according to claim 5, wherein a flange portion which projects toward the pad cover is formed at a peripheral edge of the mark member.

9. A steering wheel mark member fixing structure which fixes a mark member on a pad cover provided at a steering wheel, comprising:

fixing holes passing through the pad cover;

projecting portions having distal ends provided at a surface of the pad cover at a side opposite a vehicle occupant side, the projecting portions being adjacent to the fixing holes and projecting substantially toward the side opposite the vehicle occupant side; and fixing legs provided at the mark member and projecting toward the pad cover and adapted to be inserted into the fixing holes, wherein the mark member is fixed to the pad cover by inserting the fixing legs in the fixing holes and bending the fixing legs at an angle greater than 90° such that the fixing legs cover the distal ends of the projecting portions.

10. A steering wheel mark member fixing structure according to claim 9, wherein said projected portions are one from the group consisting of taper portions and rectangular portions.

11. A steering wheel mark member fixing structure according to claim 9, wherein said fixing legs are bent over the projecting portions at an angle greater than 110°.

12. A steering wheel mark member fixing structure according to claim 9, wherein an acute angle is formed in each of said fixing legs by a bent portion of said legs and a non-bent portion.

13. A steering wheel mark member fixing structure according to claim 12, wherein said fixing legs are substantially V-shaped as a result of said bending.

* * * * *